(12) United States Patent
Rijkenberg et al.

(10) Patent No.: US 9,908,566 B2
(45) Date of Patent: Mar. 6, 2018

(54) AUTOMOTIVE CHASSIS PART MADE FROM HIGH STRENGTH FORMABLE HOT ROLLED STEEL SHEET

(71) Applicant: TATA STEEL IJMUIDEN BV, Velsen-Noord (NL)

(72) Inventors: Rolf Arjan Rijkenberg, Haarlem (NL); David Neal Hanlon, Hillegom (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 237 days.

(21) Appl. No.: 14/399,448

(22) PCT Filed: May 7, 2013

(86) PCT No.: PCT/EP2013/059455
§ 371 (c)(1),
(2) Date: Nov. 6, 2014

(87) PCT Pub. No.: WO2013/167572
PCT Pub. Date: Nov. 14, 2013

(65) Prior Publication Data
US 2015/0099139 A1   Apr. 9, 2015

(30) Foreign Application Priority Data

May 8, 2012  (EP) .................................. 12167140

(51) Int. Cl.
*C22C 38/02*  (2006.01)
*C22C 38/04*  (2006.01)
(Continued)

(52) U.S. Cl.
CPC .............. *B62D 29/007* (2013.01); *B21B 1/38* (2013.01); *B21B 15/00* (2013.01); *C21D 8/0226* (2013.01);
(Continued)

(58) Field of Classification Search
None
See application file for complete search history.

(56) References Cited

U.S. PATENT DOCUMENTS 3,860,456 A   1/1975 Repas
4,400,223 A   8/1983 Heitmann et al.
(Continued)

FOREIGN PATENT DOCUMENTS

CA   2729790 A1   2/2010
CA   2795714   * 10/2011 ............. C22C 38/00
(Continued)

OTHER PUBLICATIONS

Machine-English translation of JP 2007-247046 A, Takahashi Atsushi et al., Sep. 27, 2007.*
(Continued)

*Primary Examiner* — Deborah Yee
(74) *Attorney, Agent, or Firm* — Vorys, Sater, Seymour and Pease LLP

(57)  ABSTRACT

A high strength hot rolled steel sheet with an excellent combination of tensile strength of at least 550 MPa and formability, including weight percent
  at most 0.15% of C,
  at most 0.5% of Si,
  between 0.5 and 2.0% of Mn,
  at most 0.06% of P,
  at most 0.008% of S,
  at most 0.1% of Al sol,
  at most 0.02% of N,
  between 0.02 and 0.45% of V,
  between 0.05 and 0.7% of Mo,
  optionally between 0.01 and 0.1% of Nb,
  balance of Fe and inevitable impurities,
wherein the steel sheet has a precipitation strengthened and substantially single-phase ferritic microstructure, wherein
(Continued)

the volume fraction of the ferrite phase in said microstructure is not lower than 97%, and wherein the precipitates in the microstructure comprise fine precipitates of composite carbides containing Mo and V and optionally Nb.

23 Claims, 4 Drawing Sheets

(51) Int. Cl.
    *C22C 38/06*     (2006.01)
    *C22C 38/12*     (2006.01)
    *C21D 9/46*     (2006.01)
    *C21D 8/02*     (2006.01)
    *B62D 29/00*     (2006.01)
    *C22C 38/00*     (2006.01)
    *B21B 1/38*     (2006.01)
    *B21B 15/00*     (2006.01)
    *C22C 38/14*     (2006.01)

(52) U.S. Cl.
    CPC .......... *C21D 8/0263* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *B21B 2015/0057* (2013.01); *C21D 2211/004* (2013.01); *C21D 2211/005* (2013.01); *Y10T 428/12799* (2015.01)

(56) References Cited

U.S. PATENT DOCUMENTS

2003/0063996 A1* 4/2003 Funakawa ............. B32B 15/013
                                                              420/124
2006/0096678 A1     5/2006   Kariya
2007/0119521 A1     5/2007   Yokota et al.

FOREIGN PATENT DOCUMENTS

| | | |
|---|---|---|
| CA | 2795714 A1 | 10/2011 |
| CA | 2843588 A1 | 2/2013 |
| CN | 1946866 A | 4/2007 |
| EP | 1338665 A1 | 8/2003 |
| EP | 1616970 A1 | 1/2006 |
| EP | 1741800 A1 | 1/2007 |
| EP | 1790737 A1 | 5/2007 |
| JP | S5020918 A | 3/1975 |
| JP | H05345916 A | 12/1993 |
| JP | 2003089842 A | 3/2003 |
| JP | 2003089843 A | 3/2003 |
| JP | 2009084643 A | 4/2009 |
| JP | 2011017061 A | 1/2011 |

OTHER PUBLICATIONS

International Search Report dated Sep. 12, 2013 from International Application PCT/EP2013/059455 to Tata Steel Ijmuiden BV filed May 7, 2013.

Notification of Transmittal of the International Preliminary Report on Patentability dated Sep. 23, 2014 from International Application PCT/EP2013/059455 to Tata Steel Ijmuiden BV filed May 7, 2013.

A. Bodin J. Sietsma et al., "Texture and Microstructure Development during Intercritical Rolling of Low-Carbon Steels"; Metallurgical and Materials Transactions A.; vol. 33A; (2002); pp. 1-15.

* cited by examiner

AUTOMOTIVE CHASSIS PART MADE FROM HIGH STRENGTH FORMABLE HOT ROLLED STEEL SHEET

CROSS-REFERENCE TO RELATED APPLICATIONS

This is a § 371 U.S. National Stage Application of International Application No. PCT/EP2013/059455 filed on May 7, 2013, claiming the priority of European Patent Application No. 12167140.8 filed on May 8, 2012.

FIELD OF THE INVENTION

The invention relates to a high strength steel sheet suitable for automotive chassis parts or the like and, more particularly, to a high strength hot rolled steel sheet having an excellent combination of tensile strength of at least 550 MPa and formability, and to a method for manufacturing the same.

BACKGROUND OF THE INVENTION

To the background of increasing demands with regard to fuel economy and carbon footprint, hot rolled steel sheets for automobiles having higher tensile strength and smaller thickness, have been developed. In particular, higher tensile strength and smaller thickness have been demanded for hot rolled steel sheets used for automotive chassis parts. On the other hand, since the automotive chassis parts usually have an intricate shape, the hot rolled steel sheet used for them is required to have high elongation and excellent stretch flangeability as well as high tensile strength. In addition, a key in-service requirement of chassis and suspension parts is high fatigue resistance.

A major problem with the known high strength steels is that they are prone to edge cracking during stretch flanging. Flanging is a bending operation that bends the edge of a part in order to add stiffness. Stretch flanging is a forming operation that creates a bent edge that curves inward in the centre. A common test for determining the stretch-flangeability of a certain material is the hole expansion test.

Hole expansion ratio has been designed in the recent past to characterize formability/stretch flangeability of hot-rolled high-strength steel. The hole expansion test is conducted by expanding a punched or machined hole, usually by pushing a conical punch through the punched or machined hole. The initial diameter $d_0$ of the hole of the test sample is measured. When a tear at the edge of the expanding hole of the test sample is observed, the travel of the punch is stopped immediately and the final diameter $d_f$ of the hole of the test sample is measured in the same way as the initial diameter.

The hole expansion value, $\lambda$, is calculated using the following equation:

$$\lambda = \frac{d_f - d_0}{d_0} \cdot 100\%$$

A major problem relating to High Strength Steel (HSS) in chassis and suspension applications is sensitivity to fatigue failure. HSS strengthened using additional hard phases, such as martensite and bainite, in a ferritic matrix are known to exhibit poor resistance to fatigue crack initiation and propagation. Fatigue performance is quantified by definition of a fatigue strength: a stress at which fatigue failure has not occurred after a specified number of loading cycles (e.g., 100000 cycles).

SUMMARY OF THE INVENTION

The object of the invention is to provide a high strength hot rolled steel sheet having a tensile strength of at least 550 MPa, high elongation and excellent stretch flangeability.

A further object of the invention is to provide a high strength hot rolled steel sheet having a tensile strength of at least 550 MPa, which is suitable for the production of intricately shaped automotive chassis parts and a method for manufacturing the same.

A further object of the invention is to provide a high strength hot rolled steel sheet having a tensile strength of at least 550 MPa, which when used to produce automotive chassis parts, exhibits excellent resistance to fatigue failure.

A further object of the invention is to provide a high strength hot rolled steel sheet according to the objects described hereinabove wherein the tensile strength is at least 580 MPa and the hole expansion ratio is at least 90%.

A further object of the invention is to provide a high strength hot rolled steel sheet according to the objects described hereinabove wherein the tensile strength is at least 750 MPa and the hole expansion ratio is at least 60%.

A further object of the invention is to provide a high strength hot rolled steel sheet according to the objects described hereinabove wherein the tensile strength is at least 980 MPa and the hole expansion ratio is at least 30%.

DETAILED DESCRIPTION OF THE PREFERRED EMBODIMENTS

Figure 1:
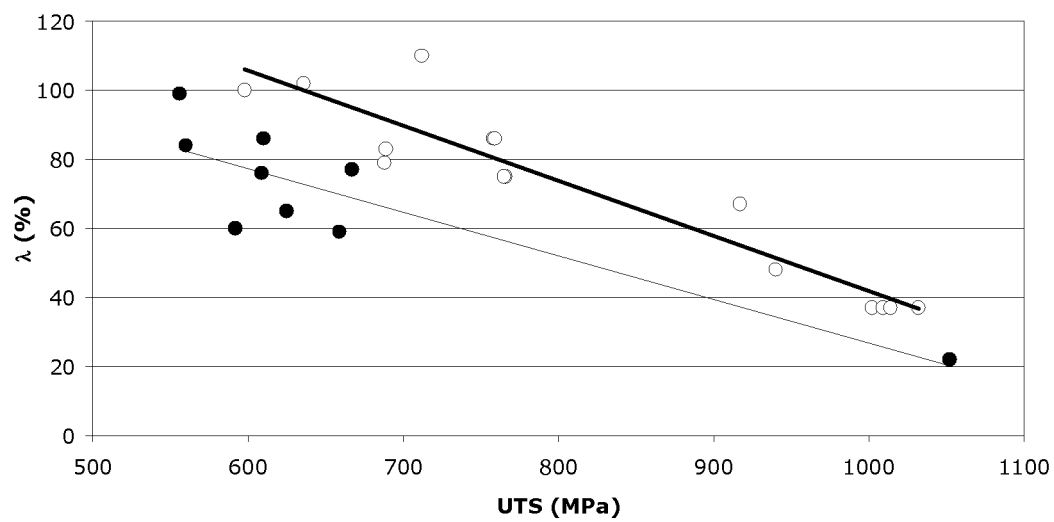
FIG. 1 shows a plot of hole expansion ratios vs. UTS.

The object is reached by providing a high strength hot rolled steel sheet with an excellent combination of tensile strength of at least 550 MPa and formability, comprising (in weight percent):
 at most 0.15% of C
 at most 0.5% of Si
 between 0.5 and 2.0% of Mn
 at most 0.06% of P
 at most 0.008% of S
 at most 0.1% of Sol. Al
 at most 0.02% of N
 between 0.02 and 0.45% of V
 between 0.05 and 0.7% of Mo
 optionally between 0.01 and 0.1% of Nb
 balance of Fe and inevitable impurities,
wherein the steel sheet has a precipitation strengthened and substantially single-phase ferritic microstructure, wherein the volume fraction of the ferrite phase in said microstructure is not lower than 97%, and wherein the precipitates in said microstructure comprise fine precipitates of composite carbides containing Mo and V and optionally Nb.

The invention provides a high-strength steel with a combination of high cold-stretch formability as well as high stretch-flange formability and solves the problem of premature edge cracking resulting from stretch-flanging. This excellent combination of high strength and formability is derived from a fine-grained and substantially single-phase ductile ferritic microstructure strengthened with a high density of fine precipitates. The single-phase ferritic microstructure provides high elongation and accommodates high stretch-flange formability without premature edge cracking since it has little internal stresses and is free of carbon-rich phase constituents or titanium-based inclusions, which may act as potential nucleation sites for premature edge cracking during stretch-flanging of a high-strength steel with a tensile strength not lower than 550 MPa. As a result, the steel exhibits a combination of high strength, high elongation and high hole-expansivity. In addition, the steel exhibits excellent fatigue properties because of said microstructure. It is believed that the absence of carbon-rich phase constituents and/or titanium-based inclusions as well as the fine-grained nature of the microstructure all contribute to high fatigue resistance. Because of the potential deleterious effect of titanium on formability and fatigue resistance, it is essential that the amount of titanium in this steel is kept as low as possible and certainly does not exceed the level of inevitable impurities. In the steel according to the invention no titanium is added deliberately as an alloying element. Titanium may be present as pick-up from scrap metal used in the process or as an impurity in other alloying additions. Although it is difficult to define the level at which the titanium content adversely affects the formability properties, the inventors found that if the content of Ti is smaller than 0.015%, preferably smaller than 0.010% then the risk of forming titanium precipitates is small.

The role of the alloying elements in this steel is as follows.

C is added to form carbide precipitates together with Nb, V and Mo in order to get a high degree of precipitation strengthening. The amount of C required to achieve the desired strength depends on the amount of Nb, V and Mo. However, the maximum amount is 0.15% to prevent the formation of carbon-rich phase constituents, which, if formed, are deleterious for hole-expansivity and fatigue resistance.

Si provides significant solid solution strengthening and retards the formation of cementite and pearlite thus suppressing the formation of coarse carbides, which impair stretch-flange formability. However, a low Si content is desired in order to reduce rolling loads, to suppress surface issues and to optimise fatigue properties. For that reason the Si content may not exceed 0.5%.

Mn provides solid solution strengthening and suppresses the ferritic transformation temperature and ferritic transformation rate. Sufficient solid solution strengthening of the ferrite matrix is required as is a low transformation temperature to maximise the precipitation strengthening during transformation. Therefore, Mn content should be at least 0.5 wt %. However, a Mn content higher than 2 wt % may lead to segregation, which will impair stretch-flange formability. Therefore, the Mn content should be in the range of 0.5 to 2.0 wt %. Preferably the minimum Mn content is 1.2%.

P provides solid solution strengthening. However, at high levels, P segregation will impair stretch-flange formability. Therefore, the P content should be 0.06 wt % or less.

Elevated S contents will impair stretch-flange formability. Therefore, the S content should be 0.008 wt % or less.

Al is added as a deoxidizer. However, too high Al will impair stretch-flange formability. Therefore, the Al content not present as an oxide (Al_sol) should be 0.1 wt % or less. The total aluminium content is Al as $Al_xO_y$+Al_sol. A suitable minimum content for Al_sol is 0.02%.

Nb provides grain refinement and precipitation strengthening. The grain refinement is of importance for a good balance between strength and elongation and is believed to contribute to improved fatigue performance. On the other hand, niobium also causes retardation of the recrystallisation during hot rolling and is therefore not always a desirable element. Its presence in this invention is therefore optional. However, the precipitation strengthening based on fine Nb composite carbides contributes to the desired strength level based on a single-phase ferritic microstructure in combination with high elongation and high hole-expansivity and if this contribution is desired then the Nb content should at least be 0.01 wt %. At Nb levels above 0.1 wt %, Nb will loose its efficiency for hot-rolled steels to achieve high yield strength and lead to undesired high rolling forces. Therefore, if present, the Nb content should be 0.01 to 0.1 wt %.

V provides precipitation strengthening. The precipitation strengthening based on fine V composite carbides is crucial to achieve the desired strength level based on a single-phase ferritic microstructure in combination with high elongation and high hole-expansivity. The V content should be in the range of 0.02 to 0.45 wt %. A suitable minimum V content is 0.04%.

Mo suppresses the cementite and pearlite formation. This is important to achieve a single-phase ferritic microstructure. In addition, Mo is required to achieve fine composite carbide precipitates based on Nb and/or V in order to achieve a high degree of precipitation strengthening. It is believed that Mo also prevents coarsening of the fine composite carbide precipitates and thereby prevents a reduction in precipitation hardening of the coarsening precipitates. Therefore, the Mo content should be in the range of 0.05 to 0.7 wt %. A suitable minimum Mo content is 0.1%.

N should be low, i.e. 0.02% (200 ppm) or less. Too high N content will impair cold-stretch and stretch-flange formability. If the contents of Al and N represented by weight percentage satisfy the equation of $(Al/27)/(N/14) \geq 1$, the dominant precipitation mode contributing to precipitation strengthening of the essentially ferritic microstructure is composite carbide precipitation based on V and Mo and optionally Nb. If the contents of Al and N represented by weight percentage satisfy the equation of $(Al/27)/(N/14) < 1$, nitride and/or carbo-nitride precipitation in addition to said composite carbide precipitation will be activated. A suitable minimum N content is 0.002% (i.e. 20 ppm).

Conventional high-strength steels with tensile strength not lower than 550 MPa partially derive their strength from carbon-rich phase constituents whether or not in combination with conventional precipitation strengthening based on niobium, vanadium and/or titanium carbo-nitride precipitates. Their microstructures may either consist of a relatively soft ferritic matrix embedded with carbon-rich and relatively hard phase constituents or consist of a partially or fully bainitic or martensitic microstructure in case of tensile strength higher than 700 MPa. EP1338665 provides an alternative concept for a high-strength steel with tensile strength not lower than 550 MPa that is based on a single-phase ferritic microstructure in which the ferrite is precipitation strengthened with a high density of fine carbides based on titanium in combination with other elements.

EP1790737 and EP1616970 provide an alternative concept based on a multi-phase, i.e. not single-phase ferritic, microstructure. In both concepts the ferrite is precipitation strengthened with a high density of fine carbide precipitates based on titanium in combination with molybdenum and optionally with additional niobium and/or vanadium. These titanium based precipitates have been found to adversely affect the formability and fatigue properties.

The steel according to the present invention derives its strength from a substantially single-phase fine-grained ferritic microstructure, which is precipitation strengthened with a high density of fine carbide precipitates based on molybdenum in combination with vanadium and/or niobium (if present). This concept avoids explicitly the use of titanium in order to prevent the presence of large titanium-rich inclusions, which may impair stretch-flange formability. In addition, a high titanium content may lead to relatively high degree of internal stress in the final microstructure, which is harmful for stretch-flange formability and will impair hole-expansivity. Using a low niobium content to achieve sufficient grain refinement in combination with vanadium and molybdenum to achieve sufficient precipitation strengthening will lead to less internal stress in the final microstructure as compared to the use of high titanium. This has a positive influence on stretch-flange formability and substantially improves hole-expansivity.

Stress localisation during stretch-flanging of fully bainitic or martensitic steels with tensile strengths higher than 700 MPa is suppressed because of their homogeneous microstructure. However, the microstructure of these high-strength steels is not able to accommodate a similar degree of strain as steel with a single-phase ferritic microstructure and similar tensile strength. As a consequence, these steels have considerably lower cold-stretch formability in comparison to the ductile single-phase ferritic microstructure according to the invention offers.

If the microstructure contains at least 97% in volume of the precipitation strengthened and substantially single-phase fine-grained ferritic matrix, then the microstructure is deemed to be a substantially single-phase ferritic microstructure and the object(s) of the present invention can be achieved which such a microstructure. However, it is preferable that microstructure contains at least 98% in volume of the precipitation strengthened and substantially single-phase fine-grained ferritic matrix, more preferably at least 99% and if possible 100%.

In an embodiment of the invention the tensile strength of the high strength hot rolled steel sheet according to the invention is at least 550 MPa, preferably at least 580 MPa.

In an embodiment of the invention the tensile strength of the high strength hot rolled steel sheet according to the invention is at least 580 MPa and the hole expansion ratio is at least 90%.

In an embodiment of the invention the tensile strength of the high strength hot rolled steel sheet according to the invention is at least 750 MPa and the hole expansion ratio is at least 60%.

In an embodiment of the invention the tensile strength of the high strength hot rolled steel sheet according to the invention is at least 980 MPa and the hole expansion ratio is at least 30%.

In an embodiment of the invention the steel sheet has a precipitation strengthened and substantially single-phase ferritic microstructure, wherein the volume fraction of the ferrite phase in said microstructure is not lower than 97%, and wherein the precipitates in said microstructure comprise fine precipitates of composite carbides containing Mo, V and Nb. Advantage of the single phase ferrite matrix is that it exhibits high formability in terms of elongation and hole-expansivity and that it exhibits high resistance to fatigue failure. The use of niobium contributes to grain refinement achieved by thermo-mechanically controlled rolling, contributing to both tensile strength and fatigue resistance. In addition, niobium, vanadium and molybdenum are relevant to provide sufficient precipitation strengthening to achieve a tensile strength not lower than 550 MPa, preferably not lower than 580 MPa. Since niobium contributes to the overall strength via both grain refinement and precipitation strengthening, increased grain strengthening with increased niobium can be used to compensate for a decreased degree of precipitation strengthening with a decreased vanadium and/or molybdenum content to achieve the desired strength level. This will reduce alloy costs.

In an embodiment the steel sheet has a precipitation strengthened and substantially single-phase ferritic microstructure, wherein the volume fraction of the ferrite phase in said microstructure is not lower than 97%, and wherein the precipitates in said microstructure comprise fine precipitates of composite carbides containing Mo and V and no Nb. This steel is substantially niobium free. Advantage of the single phase ferrite matrix is that it exhibits high formability in terms of elongation and hole-expansivity and that it exhibits good resistance to fatigue failure. The use of vanadium contributes to grain refinement achieved by recrystallised controlled rolling, contributing to both tensile strength and fatigue resistance. In addition, vanadium and molybdenum are relevant to provide sufficient precipitation strengthening to achieve a tensile strength not lower than 550 MPa, preferably not lower than 580 MPa. The benefit of using a composition containing vanadium and molybdenum, that is free of niobium, is that it will lead to lower rolling loads in the hot strip mill, which will widen the dimensional window. In addition, the use of this niobium free composition will not only allow production of this steel grade on a conventional Hot Strip Mill (HSM) but as well on a Compact Strip Production (CSP) line, leading to reduced energy input and lower processing costs.

Steel sheet according to any one of the preceding claims wherein the steel comprises:
- at least 1.2% Mn and/or
- at least 0.02% Al_sol and/or
- at least 0.04% V and/or
- at least 0.1% Mo, and/or
- at least 0.02% C and/or
- at least 0.002% N.

In a preferred embodiment a steel sheet according to the invention is provided wherein the microstructure is substantially free and preferably entirely free from carbon-rich microstructural components, such as pearlite, cementite, martensite or bainite, and/or substantially free and preferably entirely free from titanium-based precipitates or titanium-based inclusions. The presence of carbon-rich microstructural components and titanium-based inclusions will impair hole-expansivity and decrease resistance to fatigue failure. Furthermore, the use of an essentially titanium-free composition based on niobium and/or vanadium provides benefits that result from the opportunity to use lower reheating temperatures to dissolve precipitating elements, including niobium and/or vanadium. In order to form the desired volume and distribution of precipitates in the final product, alloy additions must be taken into solution during reheating of the slab in the hot strip mill. A disadvantage of the titanium alloying strategy is that very high reheating temperatures are required to dissolve coarse titanium carbides formed during casting. Vanadium and vanadium/niobium compositions require significantly lower reheating temperatures. This is beneficial for energy consumption, allows greater throughput in the reheating furnace and thus higher productivity, and, additionally, lower reheating temperatures restrict the deleterious effect that silicon additions have on surface condition. Also, the risk of hot-cracking is diminished by not alloying with titanium, thereby removing the need for hot-charging the continuously cast slabs. This allows for more flexibility in the process route.

In an embodiment a steel according to the invention is provided wherein the contents of C, Nb, V and Mo represented by weight percentage satisfy the equation of $$0.8 \leq \frac{(Nb/93) + (V/51) + (Mo/96)}{(C/12)} \leq 2.2$$

By balancing the contents of C, Nb, V and Mo this way the inventors found that stable and reproducible properties could be achieved.

Preferably (Nb/93+V/51+Mo/96)/(C/12) is larger than or equal to 1.2.

In an embodiment a steel according to the invention is provided wherein the contents of Nb, V and Mo represented by weight percentage satisfy the equation of $$0.25 \leq \frac{(Mo/96)}{(Nb/93) + (V/51)} \leq 2.0, \text{ or}$$

$$0.5 \leq \frac{(Mo/96)}{(Nb/93) + (V/51)} \leq 2.0$$

In another embodiment the ratio of (Mo/96)/(Nb/93+V/51) is larger than or equal to 1.0.

By balancing the contents of Nb, V and Mo this way the inventors found that stable and reproducible properties could be achieved.

In an embodiment a steel according to the invention is provided wherein the contents of C, N, Nb, V, Mo and Al represented by weight percentage satisfy the equation of $$0.8 \leq \frac{(Nb/93) + (V/51) + (Mo/96) + (Al/27)}{(C/12) + (N/14)} \leq 2.2$$

By balancing the contents of C, Nb, V, Mo and Al this way the inventors found that stable and reproducible properties could be achieved.

Preferably (Nb/93+V/51+Mo/96+Al/27)/(C/12+N/14) is larger than or equal to 1.2.

In an embodiment a steel according to the invention is provided wherein the contents of C, N, Nb, V, Mo and Al represented by weight percentage satisfy the equation of $$0.8 \leq \frac{(Nb/93) + (V/51) + (Mo/96) + (Al/27)}{(C/12) + (N/14)} \leq 2.2 \text{ with}$$

$$\frac{(Al/27)}{(N/14)} < 1$$

By balancing the contents of C, Nb, V, Mo and Al this way the inventors found that stable and reproducible properties could be achieved. Preferably (Nb/93+V/51+Mo/96+Al/27)/(C/12+N/14) is larger than or equal to 1.2.

In an embodiment a steel according to the invention is provided wherein the steel sheet has a zinc-based plated coating on the surface. By providing the steel with a conventional zinc-based coating, e.g. by hot dip galvanizing or electrogalvanising, the steel and also the part produced from it, is protected against corrosion.

According to a second aspect, the invention is also embodied in a method of manufacturing a high strength steel sheet with an excellent combination of tensile strength of at least 550 MPa and formability, hot rolling a steel slab comprising at most 0.15% of C, at most 0.5% of Si, between 0.5 and 2.0% of Mn, at most 0.06% of P, at most 0.008% of S, at most 0.1% of Sol. Al, at most 0.02% of N, between 0.02 and 0.45% of V, between 0.05 and 0.7% of Mo, optionally between 0.01 and 0.1% of Nb, and the balance of Fe and inevitable impurities and finishing said hot rolling at a finish hot rolling temperature of Ar3 transformation point or higher, and coiling the hot rolled steel sheet in the temperature range of between 700 and 585° C.

In an embodiment the hot rolled steel sheet is cooled to the coiling temperature at an average cooling rate of about 10° C./s to about 150° C./s and optionally the method comprises applying a zinc-based plating to the surface of the steel sheet.

According to a second aspect, the invention is also embodied in an automotive chassis part using the high strength hot rolled steel sheet according to and/or produced according to the invention, preferably wherein the high strength hot rolled steel sheet for making the automotive chassis part has a tensile strength of at least 750 MPa and a hole-expansion ratio of at least 60%, and in which tensile strength (TS), total elongation (El), and sheet thickness t (mm) satisfy the equation of $(TS \times El)/t^{0.2} > 12000$ or has a tensile strength of at least 980 MPa and a hole-expansion ratio of at least 30%, and in which tensile strength (TS), total elongation (El), and sheet thickness t (mm) satisfy the equation of $(TS \times El)/t^{0.2} > 13000$ or has a yield strength of at least 760 MPa, a minimum yield ratio of 0.9, and a hole-expansion ratio of at least 60%, and a minimum fatigue strength ($\Delta\sigma$) for 100000 cycles to failure of 1000 MPa, and in which tensile strength (TS), total elongation (El), and sheet thickness t (mm) satisfy the equation of $(TS \times El)/t^{0.2} > 12000$.

The invention will now be further explained by means of the following, non-limitative examples.

EXAMPLE

Series 1

TABLE 1

|  | Chemical composition (1/1000 wt %) | | | | | | | | | | Atomic Ratio | |
| --- | --- | --- | --- | --- | --- | --- | --- | --- | --- | --- | --- | --- | --- |
| Steel | C | Si | Mn | P | S | Al | N | Mo | Ti | Nb | V | A | B |
| A | 45 | 190 | 1620 | 13 | 5 | 46 | 6 | 200 | — | — | 190 | 1.552 | 0.559 |
| B | 26 | 19 | 1280 | 10 | 5 | 40 | 9 | 200 | — | 28 | 46 | 1.519 | 1.731 |
| C | 25 | 19 | 1290 | 13 | 4 | 41 | 6 | 200 | — | 57 | 32 | 1.598 | 1.679 |
| D | 51 | 19 | 1590 | 13 | 5 | 39 | 6 | 200 | — | 28 | 76 | 0.913 | 1.162 |
| E | 48 | 100 | 1590 | 14 | 5 | 43 | 4 | 200 | — | 27 | 78 | 0.977 | 1.144 |
| F | 85 | 190 | 1600 | 13 | 5 | 47 | 6 | 510 | — | 28 | 190 | 1.321 | 1.318 |
| G | 92 | 180 | 1600 | 14 | 5 | 41 | 6 | 510 | — | 57 | 180 | 1.235 | 1.282 |
| H | 61 | 100 | 1570 | 14 | 4 | 44 | 5 | 200 | — | 57 | 98 | 0.910 | 0.821 |
| I | 91 | 190 | 1560 | 15 | 5 | 48 | 4 | 500 | — | 54 | 240 | 1.386 | 0.985 |
| J | 50 | 180 | 1580 | 15 | 6 | 45 | 6 | 200 | — | — | 100 | 0.972 | 1.062 |
| K | 47 | 180 | 1600 | 13 | 5 | 43 | 5 | — | — | — | 200 | 1.003 | 0 |
| L | 47 | 190 | 1590 | 13 | 5 | 37 | 5 | 190 | — | 56 | — | 0.660 | 3.285 |
| M | 43 | 200 | 1650 | 13 | 5 | 34 | 5 | 190 | — | 28 | — | 0.637 | 6.570 |
| N | 39 | 180 | 1600 | 14 | 4 | 39 | 4 | — | — | 55 | — | 0.182 | 0 |
| O | 92 | 180 | 1570 | 13 | 5 | 44 | 5 | 500 | 170 | 8 | — | 1.155 | 1.432 |

Steels A to O having chemical compositions shown in Table 1 were hot rolled under the conditions given in Table 2 producing steel sheets 1 to 24 with a thickness in the range of 3.0 to 3.6 mm (RHT=Reheating Temperature; FRT=Finish Rolling Temperature; CT=Coiling Temperature; YS=Yield Strength; UTS=Ultimate Tensile Strength; El=Elongation). Note that atomic ratio A=(Ti+Nb+V+Mo)/C and atomic ratio B=Mo/(Ti+Nb+V) in table 1, 4 and 8. The hot rolled steel sheets were pickled prior to tensile testing and hole-expansion testing. Tensile properties were measured by taking out JIS No. 5 test pieces from the steel sheet parallel with the rolling direction and applying a tensile strength test to the test piece according to EN 10002-1/ISO 6892-1. In some cases, the surface roughness of the tensile test pieces was removed by thinning the test piece using gentle grinding. To determine the hole-expanding ratio λ which is considered a criterion for stretch flangeability, three steel samples sized 90 mm square were cut out from each steel sheet, followed by making a hole, 10 mm diameter, in the samples by punching. Hole-expansion testing of the samples was done with upper burring. A conical punch of 60° was pushed up from below and the hole diameter $d_f$ was measured when a through thickness crack formed. The hole-expansion ratio λ was calculated using the formula below with $d_0$=10 mm:

$$\lambda = \frac{d_f - 10}{10} \cdot 100\%$$

The microstructure was identified by using optical microscopy, scanning electron microscopy (SEM) and electron backscatter diffraction (EBSD) to identify the phase constituents in the microstructure and to measure the total fraction of cementite and/or pearlite. In addition, the average grain size was measured using EBSD. The tensile properties and hole-expansion ratios of the examined steel sheets are shown in Table 2. Also shown in Table 2 is an assessment of the type of microstructure of the examined steel sheets. The average grain size of examined steel sheets is shown in Table 3.

The steel sheets 1 to 15 of examples of this invention, have a substantially single-phase ferrite microstructure with a ferrite fraction not lower than 97%, free of titanium-based precipitates or inclusions, and comprise composite carbides containing Nb and/or V with Mo precipitated in said microstructure. They all have a UTS not lower than 550 MPa in combination with high total elongation and high hole-expansitivity. The presence of Mo for the present invention is essential to achieve high strength based on an essentially single-phase ferrite microstructure that will accommodate a high degree of hole-expansitivity. The role of Mo is to suppress the formation of cementite and/or pearlite and to promote high precipitation strengthening of the final microstructure due to the presence of a high density of fine composite carbides containing Nb and/or V with Mo.

In contrast to the aforementioned inventive examples, the steel sheets 16 to 24 of comparative examples either had microstructures that comprised a volume fraction of ferrite of lower than 97% due to the presence of cementite and/or pearlite (steel sheets 16 to 23) or microstructures that contained titanium-based inclusions (steel sheet 24). These steel sheets of comparative examples have considerably lower hole-expansivity than steel sheets 1 to 15 of inventive examples with similar UTS because either the volume fraction of ferrite was lower than 97% or due to the presence of titanium-based inclusions that gave rise to premature edge cracking during hole-expansion testing, initiating a relatively long fracture running alongside the conical punch. This is explained in FIG. 1 where the open circles represent the inventive examples, and the closed circles represent the comparative examples. The lines represent linear fits through the open and closed circles, respectively, and serve as a guide to the eye to show that the inventive examples show consistently higher hole-expansion ratios (λ-values) at a given UTS.

The calculated contribution of precipitation strengthening ($\sigma_P$) to the yield strength ($\sigma_Y$) for all inventive and comparative examples is shown in Table 3. The precipitation strengthening $\sigma_P$ was calculated using the equation below:

$$\sigma_P = \sigma_Y - \sigma_0 - \sigma_{SS} - 17.4 \times d^{-1/2} \text{ (d: ferrite grain size in mm)}$$

with $\sigma_0$ equal to 53.9 MPa and the solid-solution strengthening according to:

$$\sigma_{SS} = 32[\text{wt \% Mn}] + 83[\text{wt \% Si}] + 11[\text{wt \% Mo}] + 678[\text{wt \% P}] + 354[\text{wt \% N}_f]$$

with the amount of free (soluble) nitrogen % $N_f$ assumed to be negligible. The calculated precipitation strengthening of the inventive examples ranges from circa 150 to almost 500 MPa, depending on the amount of C, Nb, V, and Mo used. This is considerably higher than the amount of precipitation strengthening that is achieved with compositions with similar amounts of C, Nb, and V, but without Mo. The very high degree of precipitation strengthening that can be achieved by using suitable levels of C, Nb, V, and Mo is illustrated by steel sheets 12 and 13 of the inventive examples. The calculated precipitation strengthening of these two steel sheets is circa 450 to 470 MPa with an overall yield strength close to 940 MPa. Such high yield strength can not be achieved with steel sheets with a composition consisting of Nb and/or V and free of Mo, having an essentially ferrite microstructure solely strengthened with carbide precipitates containing Nb and/or V. Maximum yield strength achievable with steel sheets with such compositions ranges typically from 550 to 650 MPa, depending foremost on the amount of Nb and/or V.

The role of Mo on precipitation strengthening is further illustrated by a comparison in yield strength between steel sheet 18, having a composition based on circa 56 mwt % (i.e. 1/1000 weight %) Nb and 0.19 wt % Mo, versus steel sheet 22, having a composition based on circa 55 mwt % Nb and free of Mo. Both steel sheets of comparative examples were hot rolled under similar conditions and both steel sheets had similar fine-grained microstructures consisting of ferrite, cementite, and pearlite. The yield strength of steel sheet 18 with Mo is 62 MPa higher than that of steel sheet 22 without Mo. The additional strength is predominantly derived from additional precipitation strengthening based on composite carbides containing Nb and Mo. Results from calculation of the contribution of the precipitation strength to the overall yield strength shown in Table 3 indicate that the addition of Mo has increased the precipitation strengthening by circa 40 MPa. This illustrates the necessity of using Mo in order to substantially increase precipitation strengthening beyond that achievable with regular Nb and/or V carbide precipitation with similar Nb and/or V levels. The use of Nb and/or V in combination with Mo renders it possible to achieve a high degree of precipitation strengthening in order to obtain an essentially single-phase ferrite microstructure that will provide high strength in combination with both high elongation and high stretch flangeability.

Figure 2:
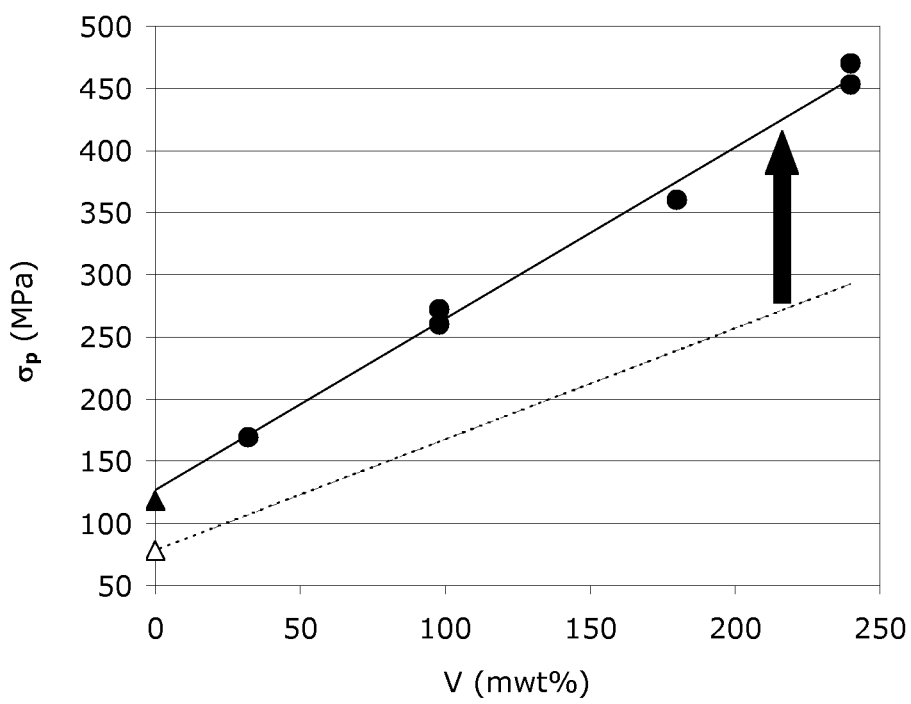
FIG. 2 shows a plot of precipitation strengthening vs. vandium content.

The beneficial role of Mo on increased precipitation strengthening is further illustrated in FIG. 2, showing precipitation strengthening (in MPa) against vanadium content (in mwt %). The closed circles correspond with the calculated precipitation for steel sheets 3, 7-9, and 12-13 of inventive examples with 0.06Nb—V—Mo compositions and produced with coiling at 630° C. The solid line represents a linear fit through the closed circles. The closed triangle corresponds with the calculated precipitation strengthening of steel sheet 18 of comparative examples with a 0.06Nb—Mo composition and coiling at 650° C. The linear fit shows that for the 0.06Nb—V—Mo compositions with circa 40-60 ppm nitrogen, vanadium in combination with a sufficient amount of molybdenum raises the precipitation strength $\Delta\sigma_P$ with circa 1400 MPa/wt % of vanadium. As a rule of thumb, vanadium in the absence of molybdenum and a nitrogen level of 40-60 ppm raises the precipitation strength $\Delta\sigma_P$ with circa 890 MPa/wt % for coiling around 630-650° C., given the Mn and C contents as shown in Table 1. The dotted line in FIG. 2 shows the calculated precipitation strengthening as a function of vanadium content for steel sheets coiled at 630-650° C. and with 0.06Nb—V compositions free of molybdenum. The open triangle on the dotted line corresponds with steel sheet 22 of comparative examples coiled at 650° C. and with a 0.06Nb composition, free of vanadium and molybdenum. The distance between the solid and dotted line represents the beneficial influence of the molybdenum addition on increasing the contribution of vanadium precipitation strengthening and shows the necessity of molybdenum to produce a high-strength steel sheet with a single-phase ferritic microstructure.

Figure 3:
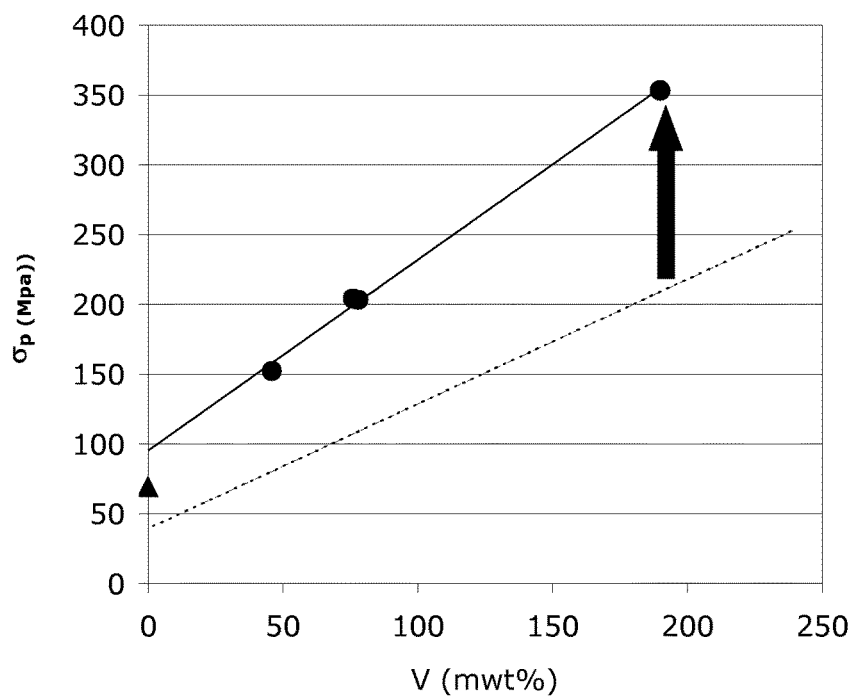
FIG. 3 shows a plot of precipitation strengthening vs. vandium content.

FIG. 3 shows a similar graph as that of FIG. 2, albeit that the data corresponds for steel sheets coiled at 630-650° C. and with 0.03Nb—V—Mo (steel sheets 2 and 4-6 of inventive examples indicated with closed circles) and 0.03Nb—V compositions (dotted line), both with nitrogen levels of 40-60 ppm. The closed triangle corresponds with the calculated precipitation strengthening for steel sheet 20 of the comparative examples with a 0.03Nb—Mo composition, free of vanadium. As in FIG. 2, the arrow denotes the increase caused by the molybdenum addition.

To produce a steel sheet with a desired strength level and with an essentially ferrite microstructure free of cementite and/or pearlite to accommodate high elongation and high hole-expansitivity, the amount of C, Nb and/or V, and Mo need to be in balance. If the amount of Nb and/or V in combination with Mo is too low with respect to the amount of C, as is the case for steel sheets 18 to 21 of the comparative examples, the microstructure will not be essentially single-phase ferritic and substantial amounts of cementite and/or pearlite will be present in the microstructure impairing hole-expansitivity. If the amount of Mo is too low compared to the amount of Nb and/or V, the amount of precipitation strengthening will not be optimal and the desired strength level will not be achieved with a fine-grained single-phase ferritic microstructure.

Figure 4:
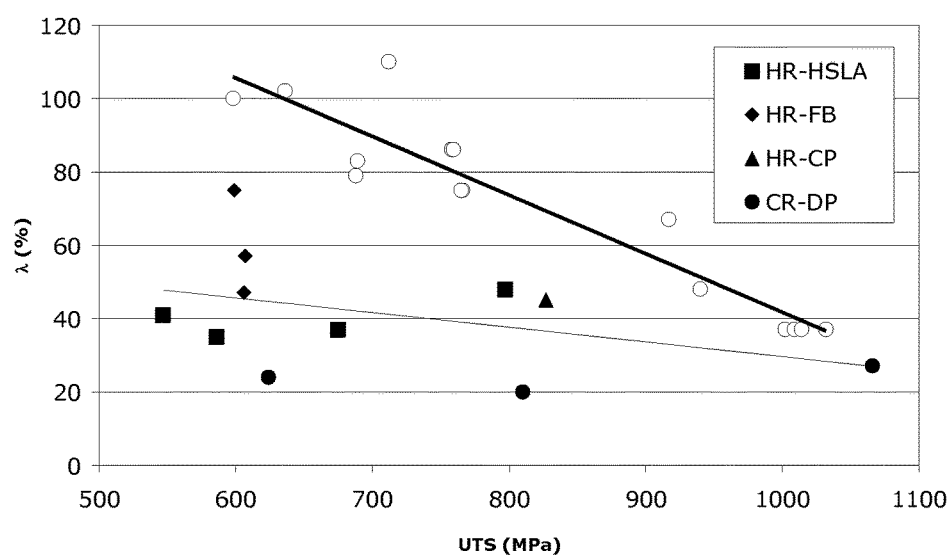
FIG. 4 shows a plot of hole expansion ratios vs. UTS.

FIG. 4 illustrates the advantage of the inventive examples of the present invention in terms of tensile strength and hole-expansitivity compared to conventional hot rolled High Strength Low Alloy (HSLA) steels and hot or cold rolled Advanced High Strength (AHS) steels, including Ferrite-Bainite (FB), Complex Phase (CP), and Dual Phase (DP) steel sheets. Clearly, the inventive examples of the present invention with their essentially single-phase ferritic microstructures provide substantially higher hole-expansitivity values than HSLA or AHS steel sheets with multi-phase microstructures and with similar tensile strength. FIG. 4 illustrates that the present invention offers a distinct benefit over current HSLA or AHS steel sheets for steel applications where an excellent combination of high strength and high stretch-flange formability is required. An example of such an application is chassis and suspension parts.

Figure 5:
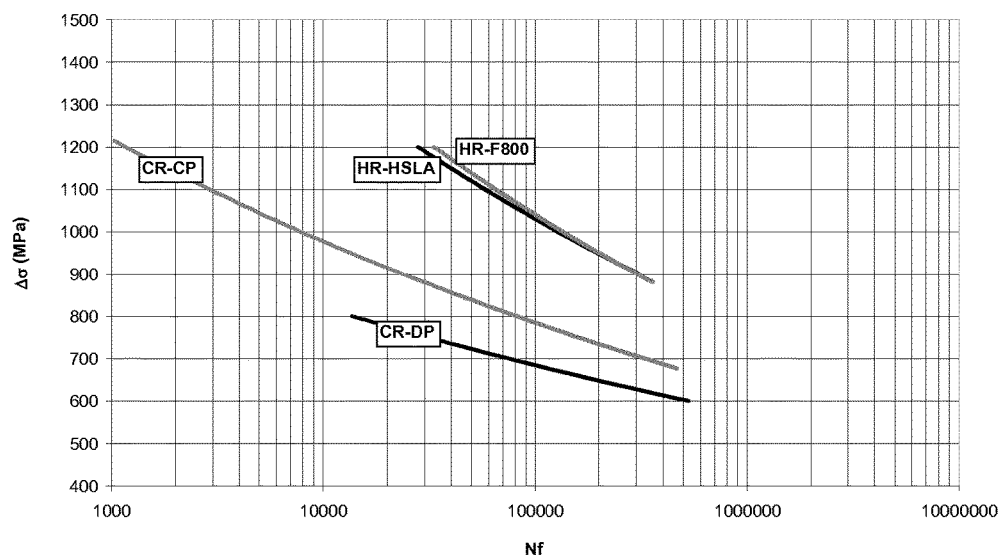
FIG. 5 shows a plot of fatigue strength vs. cycles to failure.
Figure 6:
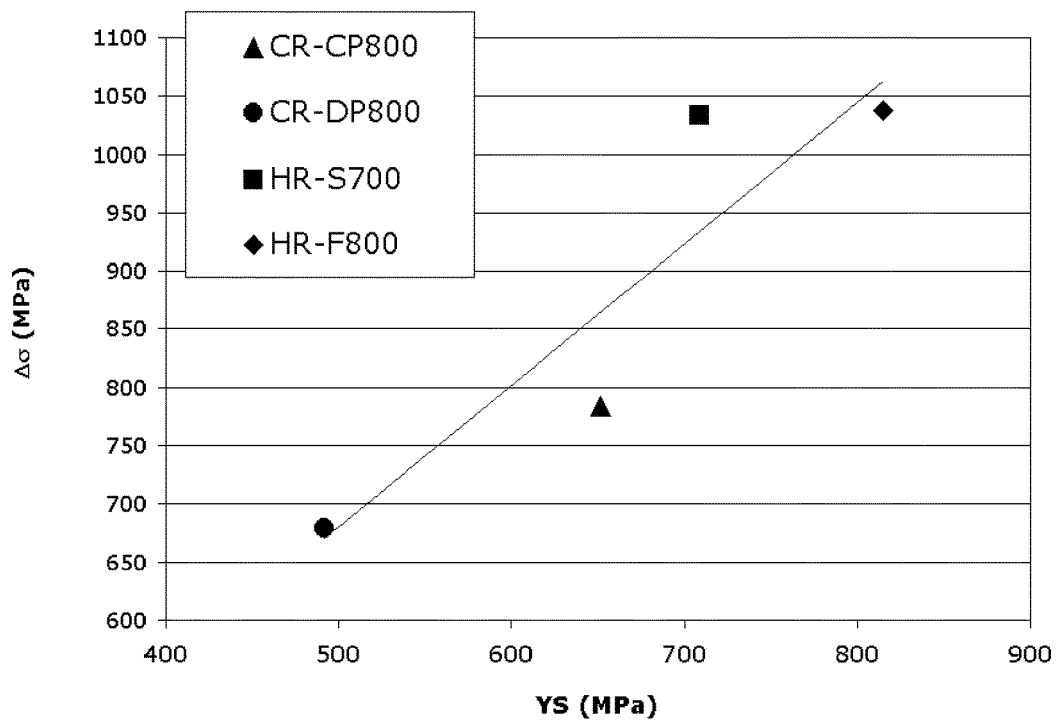
FIG. 6 shows a plot of fatigue strength vs. yield strength for data of Example Series 1.

Steel sheets for chassis and suspension applications do not only require high strength in combination with excellent cold-stretch and stretch-flange formability, but also require a high resistance to fatigue failure. One of the dominant factors controlling fatigue properties is the microstructure. In general, it is believed that a small grain size and a homogeneous microstructure free of relatively hard carbon-rich phase constituents, including pearlite, bainite and/or martensite, is beneficial for fatigue properties. Differences in hardness between phase constituents in a multi-phase microstructure are believed to be deleterious for fatigue due to stress localization and this harmful influence on fatigue resistance increases as the difference in hardness between carbon-rich phase constituents and the matrix increases. Apart from carbon-rich phase constituents, also large titanium-based precipitates, promoting equally stress localization, can impair fatigue resistance. FIG. 5 shows S-N (Stress (in MPa) as a function of cycles to failure (Nf)) fatigue curves with data considered as typical for cold-rolled (CR) DP800 and CP800, hot-rolled (HR) HSLA S700, and an essentially single-phase ferritic hot-rolled steel grade (HR-F800) with high precipitation strengthening based on titanium and molybdenum. The curves were determined using uni-axial high-cycle fatigue testing with a ratio of maximum load (R value) of −1. The data in FIG. 5 confirms the aforementioned deleterious influence of carbon-rich phase constituents on fatigue properties. The fatigue strength (expressed in Δσ) for 100000 cycles to failure increases going from a Dual-Phase microstructure with a high hardness difference between ferrite matrix and martensite islands, to a Complex Phase microstructure consisting predominantly of a ferrite matrix and bainite with a consequently much smaller difference in hardness between phase constituents. Data in FIG. 5 corroborates that as the difference in hardness between phase constituents in the microstructure is further reduced, the fatigue strength is further increased as is evident from the data shown for HR-S700 and HR-F800, which have predominantly ferritic microstructures comprising only a minor or negligible fraction of pearlite, respectively, contributing to a relatively low degree of stress localization during cyclic loading. However, the composition of both steel sheets contains titanium and their microstructure comprise large titanium-based inclusions. Following the aforementioned principles, the steel sheets 1 to 16 of inventive examples of this invention with an essentially single-phase ferritic microstructure free of carbon-rich phase constituents and large titanium-based inclusions which give way to stress localisation during cyclic loading, will have a superior fatigue strength. FIG. 6 shows the fatigue strength for failure at 100000 cycles derived from the S-N curves from FIG. 5 plotted against the yield strength (in MPa). The line represents a linear fit and shows a clear correlation between yield stress and fatigue strength, which confirms the aforementioned influence of microstructure on fatigue strength. As an indicative example, FIGS. 5 and 6 show that the minimum fatigue strength for 100000 cycles is 1000 MPa for a hot rolled steel sheet having a yield strength of at least 760 MPa and a minimum yield ratio of 0.9, based on an essentially single-phase ferritic microstructure which is precipitation strengthened with composite carbide precipitates containing Mo, V and optionally Nb as claimed in the present invention.

EXAMPLE

Series 2

Steels 2A to 2K having chemical compositions shown in Table 4 were hot rolled under the conditions given in Tables 5 and 6 producing steel sheets 1 to 66 with hot rolling to a final thickness of circa 3.0 to 3.5 mm. The cooling rate on the run-out-table was 50° C./s for all hot rolled steel sheets listed in Tables 5 and 6. The hot rolled steel sheets were pickled prior to testing (tensile testing, hole-expansion testing, bendability testing, and fatigue testing). In some cases, the steel sheets were gently grinded prior to testing to remove the surface roughness from hot-rolling.

The tensile properties of steel sheets 1 to 66 are shown in Tables 5 and 6. Tensile testing and hole-expansion testing was carried out in exactly the same way as disclosed in Example—Series 1. The hole-expanding ratios of steel sheets 1 to 61 are shown in Table 5.

TABLE 4

| | Chemical composition (1/1000 wt %) | | | | | | | | | | Atomic Ratio | |
|---|---|---|---|---|---|---|---|---|---|---|---|---|
| Steel | C | Si | Mn | P | S | Al | N | Mo | Ti | Nb | V | A | B |
| 2A | 20 | 22 | 1320 | 16 | 5 | 34 | 4 | 150 | — | 27 | 85 | 2.115 | 0.798 |
| 2B | 24 | 19 | 1260 | 14 | 6 | 41 | 4 | 150 | — | 54 | 39 | 1.456 | 1.161 |
| 2C | 37 | 31 | 1560 | 14 | 5 | 44 | 3 | 240 | — | 27 | 160 | 1.926 | 0.729 |
| 2D | 48 | 20 | 1610 | 14 | 6 | 40 | 4 | 250 | — | 54 | 180 | 1.681 | 0.633 |
| 2E | 89 | 22 | 1600 | 14 | 5 | 56 | 5 | 500 | — | 27 | 260 | 1.431 | 0.966 |
| 2F | 96 | 26 | 1560 | 15 | 6 | 50 | 4 | 510 | — | 56 | 250 | 1.354 | 0.964 |
| 2G | 44 | 100 | 1590 | 0 | 2 | 10 | 17 | 240 | — | 30 | 164 | 1.650 | 0.706 |
| 2H | 45 | 110 | 1610 | 1 | 1 | 45 | 16 | 260 | — | 55 | 106 | 1.436 | 1.014 |
| 2I | 64 | 100 | 1580 | 2 | 2 | 46 | 2 | 260 | — | 31 | 214 | 1.359 | 0.597 |
| 2J | 87 | 190 | 1580 | 1 | 2 | 6 | 17 | 480 | — | 30 | 275 | 1.480 | 0.874 |
| 2K | 92 | 200 | 1590 | 1 | 2 | 38 | 15 | 500 | — | 56 | 224 | 1.333 | 1.042 |

A number of steel sheets were also subjected to bendability testing. The bending angles were determined using a three point bending device according to the procedure described in the VDA norm 238-100. The norm specifies the test conditions, tooling, geometry and experimental settings as well as bendability limit assessment. The VDA norm 238-100 also specifies a method for calculating the bending angle $\alpha_t$. In order to allow a direct comparison between steels with different thickness, a thickness correction factor equal to the square root of the materials thickness t is commonly used. The angles of materials with thickness different than 1 mm are then recalculated using the formula:

$$\alpha_{t=1\ mm} = \alpha_t \sqrt{t}$$

During the bending test, the force required to displace the punch to force bending of the steel sheet is monitored. This allows a determination of the maximum strain that was achieved during the bending test. The measured bending angles of steel sheets 62 to 66 and the maximum strain achieved during the bending tests are shown in Table 6. Testing of the steel sheets was done in two directions, i.e., parallel and perpendicular to rolling direction. The reported bending angles in Table 6 are the recalculated values $\alpha_{t=1\ mm}$ based on the measured bending angles according to VDA 238-100.

The microstructure was identified by using optical microscopy to identify the phase constituents in the microstructure and to measure the total fraction of cementite and/or pearlite.

Optical microscopy and TEM/EDX analysis showed that the steel sheets 1 to 66 of examples of this invention, have a substantially single-phase ferrite microstructure with a ferrite fraction not lower than 97%, free of titanium-based precipitates or inclusions, and comprise composite carbides containing Nb and/or V with Mo precipitated in said microstructure.

The substantially single-phase ferrite microstructure of steel sheets 1 to 66 strengthened with a high density of composite carbides to provide sufficient strength to the ductile ferrite microstructure, accommodates excellent formability in terms of tensile elongation, hole-expansion capacity as well as bendability. This is clear from the reported tensile properties, hole-expansion ratios, and bending angles in Tables 5 and 6 for steel sheets 1 to 66.

Figure 7:
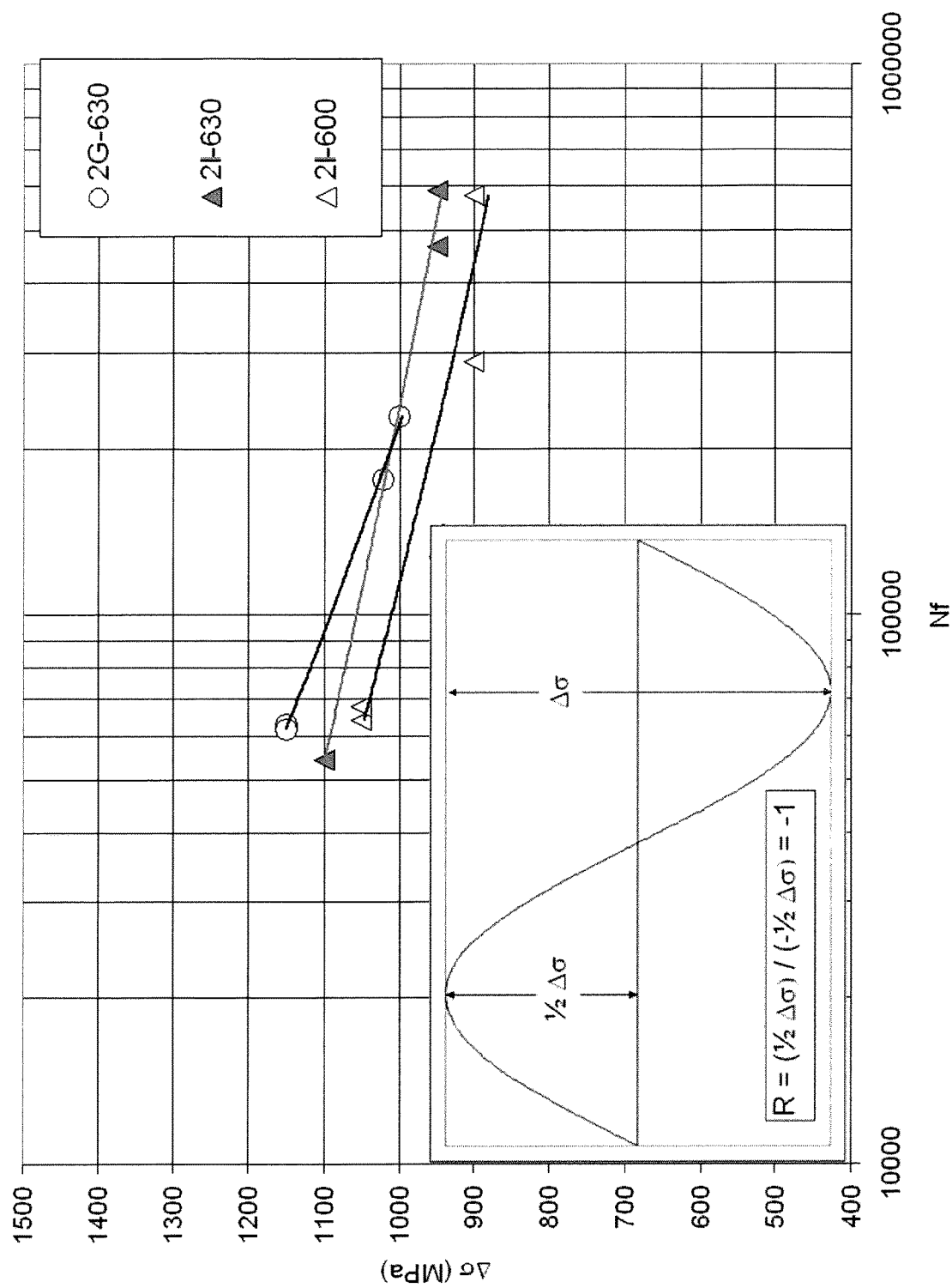
FIG. 7 shows a plot of fatigue strength vs. cycles to failure for data of Example-Series 3.

A number of steel sheets were tested on fatigue response by constructing S-N fatigue curves (Stress (in MPa) as a function of cycles to failure (Nf)) according to the British Standard Methods of Fatigue Testing Part 1 (guide to general principles—BS 3518: Part 1). The S-N curves were determined based on uni-axial fatigue testing with a ratio of maximum load (R value) of −1. In an attempt to investigate as much as possible the fatigue response of the microstructure without interference from surface roughness on fatigue response, the samples were polished prior to fatigue testing. For composition 2G, one steel sheet coiled at 630° C. was tested on fatigue response. For composition I, two steel sheets were tested on fatigue response, i.e., one steel sheet coiled at 600° C. (sample I-600) and one steel sheet coiled at 630° C. (sample I-630). The hot rolling conditions and tensile properties of all three samples are given in Table 7. FIG. 7 shows S-N curves corresponding with steel sheets 2G-630, 2I-600 and 2I-630. The data plotted in FIG. 7 shows that apart from high tensile elongation in combination with high hole-expansion capacity and/or bendability, the substantially single-phase ferrite microstructure of steel sheets of examples of this invention also provides excellent fatigue strength. The data in FIG. 7 are consistent with those of HR-F800 in FIG. 5.

EXAMPLE

Series 3

Steels 3A and 3B having chemical compositions shown in Table 8 were hot rolled under the conditions given in Table 9 producing steel sheets 1 to 8 with hot rolling to a final thickness of circa 3.0 to 3.5 mm. Two different cooling rates on the run-out-table were used, i.e., 50 and 100° C./s. The hot rolled steel sheets were pickled prior to tensile testing and hole-expansion testing. In some cases, the steel sheets were gently grinded prior to testing to remove the surface roughness from hot-rolling.

TABLE 8

| | Chemical composition (1/1000 wt %) | | | | | | | | | | Atomic Ratio | |
|---|---|---|---|---|---|---|---|---|---|---|---|---|
| Steel | C | Si | Mn | P | S | Al | N | Mo | Ti | Nb | V | A | B |
| 3A | 60 | 106 | 1740 | 3 | 1 | 17 | 1 | 150 | — | 58 | 218 | 1.294 | 0.319 |
| 3B | 51 | 102 | 1720 | 2 | 2 | 9 | 15 | 150 | — | 58 | 217 | 1.518 | 0.320 |

Tensile and hole-expansion testing of the samples was done with upper burring and was carried out in exactly the same way as disclosed in Examples 1 and 2. The tensile properties of steel sheets 1 to 8 are shown in Table 9. The hole-expanding ratios of steel sheets 1 to 8 are shown in Table 9.

Optical microscopy showed that the steel sheets 1 to 8 of examples of this invention, have a substantially single-phase ferrite microstructure with a ferrite fraction not lower than 97%, free of titanium-based precipitates or inclusions, and comprise composite carbides containing Nb and/or V with Mo precipitated in said microstructure.

The substantially single-phase ferrite microstructure of steel sheets 1 to 8 strengthened with a high density of composite carbides to provide sufficient strength to the ductile ferrite microstructure, accommodates excellent formability in terms of tensile elongation, hole-expansion capacity as is clear from the tensile properties and hole-expansion ratios in Table 9 for steel sheets 1 to 8.

TABLE 2

| | | Hot-rolling conditions | | | | Tensile properties[1] | | | | | | |
|---|---|---|---|---|---|---|---|---|---|---|---|---|
| Sheet | Steel | RHT (°C.) | FRT (°C.) | CT (°C.) | Thickness (mm) | YS (MPa) | UTS (MPa) | El (%) | Gauge[2] (mm) | λ[3] (%) | Structure[4] | Example |
| 1 | A | 1200 | 935 | 650 | 3.2 | 630 | 712 | 18.2 | 3.2 | 110 | F | Inventive |
| 2 | B | 1220 | 890 | 630 | 3.3 | 555 | 598 | 24.2 | 2.7* | 100 | F | Inventive |
| 3 | C | 1220 | 895 | 630 | 3.4 | 596 | 636 | 22.6 | 2.5* | 102 | F | Inventive |
| 4 | D | 1220 | 900 | 630 | 3.4 | 623 | 689 | 22.8 | 2.8* | 83 | F | Inventive |
| s5 | E | 1220 | 910 | 630 | 3.4 | 625 | 688 | 23.3 | 2.8* | 79 | F | Inventive |
| 6 | F | 1220 | 910 | 630 | 3.4 | 859 | 917 | 18.8 | 2.8* | 67 | F | Inventive |
| 7 | G | 1220 | 895 | 630 | 3.3 | 882 | 940 | 17.8 | 2.8* | 48 | F | Inventive |
| 8 | H | 1220 | 920 | 630 | 3.4 | 701 | 766 | 21.0 | 2.8* | 75 | F | Inventive |
| 9 | H | 1220 | 935 | 630 | 3.4 | 696 | 765 | 21.5 | 3.0* | 75 | F | Inventive |
| 10 | H | 1220 | 915 | 600 | 3.4 | 684 | 758 | 19.8 | 3.1* | 86 | F | Inventive |
| 11 | H | 1220 | 920 | 600 | 3.5 | 682 | 759 | 19.9 | 3.0* | 86 | F | Inventive |
| 12 | I | 1220 | 925 | 630 | 3.6 | 937 | 1002 | 17.9 | 3.0* | 37 | F | Inventive |
| 13 | I | 1220 | 930 | 630 | 3.5 | 945 | 1009 | 18.3 | 3.1* | 37 | F | Inventive |
| 14 | I | 1220 | 915 | 600 | 3.5 | 861 | 1032 | 16.3 | 3.1* | 37 | F | Inventive |
| 15 | I | 1220 | 930 | 600 | 3.4 | 802 | 1014 | 16.2 | 3.0* | 37 | F | Inventive |
| 16 | J | 1220 | 920 | 650 | 3.6 | 536 | 610 | 23.3 | 3.6 | 86 | F + C + P | Comparative |
| 17 | K | 1200 | 910 | 600 | 2.9 | 570 | 667 | 21.0 | 2.9 | 77 | F + C + P | Comparative |
| 18 | L | 1200 | 905 | 650 | 3.5 | 572 | 625 | 25.4 | 3.5 | 65 | F + C + P | Comparative |
| 19 | L | 1200 | 915 | 600 | 3.1 | 601 | 659 | 19.4 | 3.1 | 59 | F + C + P | Comparative |
| 20 | M | 1200 | 935 | 650 | 3.5 | 492 | 556 | 26.8 | 3.5 | 99 | F + C + P | Comparative |
| 21 | M | 1200 | 925 | 600 | 3.1 | 545 | 609 | 20.6 | 3.1 | 76 | F + C + P | Comparative |
| 22 | N | 1200 | 915 | 650 | 3.0 | 510 | 560 | 25.2 | 3.0 | 84 | F + C + P | Comparative |
| 23 | N | 1200 | 900 | 600 | 3.1 | 532 | 592 | 24.2 | 3.1 | 60 | F + C + P | Comparative |
| 24 | O | 1220 | 905 | 600 | 3.6 | 1003 | 1052 | 17.5 | 3.5 | 22 | F | Comparative |

[1]Based on JIS No. 5 tensile test piece (50 × 25 mm) and testing parallel to rolling direction.
[2]Thickness of the tensile test piece. In case the thickness of the tensile test piece is lower than that of the as-rolled steel sheet (indicated with *), the tensile test piece was gently grinded to remove surface roughness.
[3]Hole-expansion ratio: punched hole with 10 mm diameter, upper burring.
[4]Structure is assigned as predominantly ferrite (F) if ferrite fraction is 97% or more. Structure is assigned as ferrite with cementite and pearlite (F + C + P) if the total fraction cementite and pearlite is more than 3%.

TABLE 3

| Sheet | Steel | YS[1] (MPa) | UTS[1] (MPa) | Grain size[2] (μm) | Precipitation strengthening[3] (MPa) | Structure[4] | Example |
|---|---|---|---|---|---|---|---|
| 1 | A | 630 | 712 | 4.06 | 224 | F | Inventive |
| 2 | B | 555 | 598 | 3.42 | 152 | F | Inventive |
| 3 | C | 596 | 636 | 2.98 | 169 | F | Inventive |
| 4 | D | 623 | 689 | 3.32 | 204 | F | Inventive |
| 5 | E | 625 | 688 | 3.43 | 203 | F | Inventive |
| 6 | F | 859 | 917 | 2.20 | 353 | F | Inventive |
| 7 | G | 882 | 940 | 2.02 | 360 | F | Inventive |
| 8 | H | 701 | 766 | 3.26 | 272 | F | Inventive |
| 9 | H | 696 | 765 | 3.11 | 260 | F | Inventive |
| 10 | H | 684 | 758 | 2.83 | 233 | F | Inventive |
| 11 | H | 682 | 759 | 2.95 | 238 | F | Inventive |
| 12 | I | 937 | 1002 | 2.49 | 453 | F | Inventive |
| 13 | I | 945 | 1009 | 2.63 | 470 | F | Inventive |
| 14 | I | 861 | 1032 | 1.67 | 300 | F | Inventive |
| 15 | I | 802 | 1014 | 2.19 | 295 | F | Inventive |
| 16 | J | 536 | 610 | 4.34 | 138 | F + C + P | Comparative |
| 17 | K | 570 | 667 | 4.11 | 170 | F + C + P | Comparative |
| 18 | L | 572 | 625 | 2.91 | 118 | F + C + P | Comparative |
| 19 | L | 601 | 659 | 1.55 | 28 | F + C + P | Comparative |
| 20 | M | 492 | 556 | 3.63 | 69 | F + C + P | Comparative |
| 21 | M | 545 | 609 | 1.91 | 13 | F + C + P | Comparative |
| 22 | N | 510 | 560 | 3.32 | 78 | F + C + P | Comparative |
| 23 | N | 532 | 592 | 2.95 | 82 | F + C + P | Comparative |
| 24 | O | 1003 | 1052 | 1.94 | 475 | F | Comparative |

[1]Based on JIS No. 5 tensile test piece (50 × 25 mm) and testing parallel to rolling direction.
[2]Average effective grain size by number at ¼ thickness as measured by EBSD on longitudinal cross section.
[3]Estimated contribution of precipitation strengthening ($\sigma_p$) to the yield strength ($\sigma_Y$) using the following equation: $\sigma_p = \sigma_Y - \sigma_0 - \sigma_{ss} - 17.4 \times d^{-1/2}$ (d: ferrite grain diameter in mm), with $\sigma_0$ equal to 53.9 MPa and solid-solution strengthening $\sigma_{ss}$ according to: $\sigma_{ss} = 32[\%\,Mn] + 83[\%\,Si] + 11[\%\,Mo] + 678[\%\,P] + 354[\%\,N_f]$ with the amount of free (soluble) nitrogen % $N_f$ assumed to be negligible.
[4]Structure is assigned as predominantly ferrite (F) if ferrite fraction is 97% or more. Structure is assigned as ferrite with cementite and pearlite (F + C + P) if the total fraction cementite and pearlite is more than 3%.

TABLE 5

| | | Hot-rolling conditions | | | Tensile properties[1] | | | Gauge[2] (mm) | λ[3] (%) | Structure[4] | Example |
|---|---|---|---|---|---|---|---|---|---|---|---|
| Sheet | Steel | RHT (°C.) | FRT (°C.) | CT (°C.) | YS (MPa) | UTS (MPa) | El (%) | | | | |
| 1 | 2A | 1220 | 875 | 600 | 581 | 624 | 22.1 | 3.2 | 90 | F | Inventive |
| 2 | 2A | 1220 | 895 | 600 | 563 | 622 | 21.2 | 3.0 | 112 | F | Inventive |
| 3 | 2A | 1220 | 900 | 600 | 558 | 611 | 23.3 | 3.6 | 103 | F | Inventive |
| 4 | 2A | 1220 | 910 | 630 | 556 | 615 | 22.2 | 3.0 | 131 | F | Inventive |
| 5 | 2A | 1220 | 900 | 630 | 546 | 610 | 23.5 | 3.1 | 101 | F | Inventive |
| 6 | 2A | 1220 | 915 | 630 | 548 | 598 | 24.7 | 3.5 | 120 | F | Inventive |
| 7 | 2B | 1220 | 910 | 600 | 586 | 649 | 20.4 | 3.2 | 121 | F | Inventive |
| 8 | 2B | 1220 | 900 | 600 | 601 | 655 | 19.9 | 3.1 | 95 | F | Inventive |
| 9 | 2B | 1220 | 910 | 600 | 589 | 636 | 20.6 | 3.7 | 90 | F | Inventive |
| 10 | 2B | 1220 | 915 | 630 | 583 | 635 | 22.2 | 3.0 | 93 | F | Inventive |
| 11 | 2B | 1220 | 915 | 630 | 587 | 635 | 22.0 | 3.0 | 90 | F | Inventive |
| 12 | 2B | 1220 | 915 | 630 | 575 | 621 | 22.1 | 3.6 | 116 | F | Inventive |
| 13 | 2C | 1220 | 900 | 600 | 647 | 755 | 18.5 | 3.1 | 87 | F | Inventive |
| 14 | 2C | 1220 | 920 | 600 | 633 | 741 | 19.8 | 3.1 | 87 | F | Inventive |
| 15 | 2C | 1220 | 895 | 600 | 622 | 722 | 18.9 | 3.6 | 84 | F | Inventive |
| 16 | 2C | 1220 | 905 | 630 | 674 | 747 | 19.8 | 3.1 | 92 | F | Inventive |
| 17 | 2C | 1220 | 920 | 630 | 666 | 748 | 19.7 | 3.0 | 84 | F | Inventive |
| 18 | 2C | 1220 | 910 | 630 | 651 | 719 | 19.4 | 3.6 | 96 | F | Inventive |
| 19 | 2C | 1220 | 885 | 650 | 648 | 719 | 21.7 | 3.3 | 87 | F | Inventive |
| 20 | 2C | 1220 | 920 | 650 | 640 | 718 | 21.0 | 3.0 | 90 | F | Inventive |
| 21 | 2D | 1220 | 900 | 600 | 757 | 834 | 19.3 | 3.3 | 50 | F | Inventive |
| 22 | 2D | 1220 | 900 | 600 | 730 | 823 | 18.2 | 3.2 | 60 | F | Inventive |
| 23 | 2D | 1220 | 905 | 600 | 729 | 811 | 18.9 | 3.7 | 72 | F | Inventive |
| 24 | 2D | 1220 | 925 | 630 | 746 | 822 | 18.8 | 3.2 | 62 | F | Inventive |
| 25 | 2D | 1220 | 925 | 630 | 739 | 813 | 19.1 | 3.2 | 61 | F | Inventive |
| 26 | 2D | 1220 | 925 | 630 | 728 | 797 | 18.7 | 3.6 | 66 | F | Inventive |
| 27 | 2D | 1220 | 920 | 650 | 697 | 778 | 20.3 | 3.1 | 78 | F | Inventive |
| 28 | 2D | 1220 | 915 | 650 | 701 | 783 | 20.6 | 3.0 | 66 | F | Inventive |
| 29 | 2D | 1220 | 915 | 650 | 690 | 768 | 19.2 | 3.5 | 70 | F | Inventive |
| 30 | 2E | 1220 | 920 | 630 | 920 | 979 | 17.8 | 3.2 | 41 | F | Inventive |
| 31 | 2E | 1220 | 920 | 630 | 919 | 984 | 17.2 | 3.3 | 51 | F | Inventive |
| 32 | 2E | 1220 | 905 | 630 | 892 | 948 | 18.1 | 3.6 | 59 | F | Inventive |
| 33 | 2E | 1220 | 900 | 650 | 835 | 896 | 18.0 | 3.3 | 52 | F | Inventive |
| 34 | 2E | 1220 | 905 | 650 | 816 | 885 | 18.1 | 3.3 | 65 | F | Inventive |
| 35 | 2E | 1220 | 895 | 650 | 844 | 903 | 19.2 | 3.7 | 70 | F | Inventive |
| 36 | 2F | 1220 | 925 | 630 | 915 | 983 | 17.9 | 3.2 | 40 | F | Inventive |
| 37 | 2F | 1220 | 910 | 630 | 916 | 976 | 18.0 | 3.3 | 36 | F | Inventive |
| 38 | 2F | 1220 | 930 | 630 | 902 | 964 | 18.2 | 3.7 | 48 | F | Inventive |
| 39 | 2F | 1220 | 900 | 650 | 810 | 888 | 17.9 | 3.2 | 47 | F | Inventive |
| 40 | 2F | 1220 | 900 | 650 | 824 | 895 | 19.0 | 3.1 | 52 | F | Inventive |
| 41 | 2F | 1220 | 925 | 650 | 804 | 884 | 18.8 | 3.7 | 45 | F | Inventive |
| 42 | 2G | 1220 | 900 | 600 | 784 | 832 | 17.4 | 2.9 | 92 | F | Inventive |
| 43 | 2G | 1220 | 915 | 600 | 771 | 828 | 17.2 | 3.0 | 80 | F | Inventive |
| 44 | 2G | 1220 | 885 | 630 | 786 | 822 | 20.3 | 3.2 | 84 | F | Inventive |
| 45 | 2G | 1220 | 875 | 630 | 785 | 825 | 19.4 | 3.1 | 90 | F | Inventive |
| 46 | 2H | 1220 | 870 | 600 | 747 | 794 | 20.2 | 3.1 | 60 | F | Inventive |
| 47 | 2H | 1220 | 880 | 600 | 752 | 801 | 20.5 | 3.3 | 68 | F | Inventive |
| 48 | 2H | 1220 | 890 | 630 | 771 | 803 | 20.3 | 3.0 | 80 | F | Inventive |
| 49 | 2H | 1220 | 895 | 630 | 769 | 802 | 19.9 | 2.9 | 91 | F | Inventive |
| 50 | 2I | 1220 | 890 | 600 | 712 | 811 | 19.6 | 3.0 | 119 | F | Inventive |
| 51 | 2I | 1220 | 890 | 630 | 780 | 843 | 18.6 | 3.0 | 101 | F | Inventive |
| 52 | 2I | 1220 | 885 | 650 | 701 | 771 | 19.9 | 3.0 | 117 | F | Inventive |
| 53 | 2I | 1220 | 865 | 650 | 710 | 787 | 16.6 | 2.9 | 123 | F | Inventive |
| 54 | 2J | 1220 | 910 | 600 | 935 | 1022 | 15.9 | 3.0 | 99 | F | Inventive |
| 55 | 2J | 1220 | 915 | 600 | 966 | 1022 | 16.1 | 3.0 | 58 | F | Inventive |
| 56 | 2J | 1220 | 890 | 630 | 940 | 983 | 18.4 | 3.3 | 49 | F | Inventive |
| 57 | 2J | 1220 | 910 | 630 | 944 | 986 | 16.1 | 3.1 | 54 | F | Inventive |
| 58 | 2K | 1220 | 890 | 600 | 887 | 997 | 17.1 | 3.4 | 41 | F | Inventive |
| 59 | 2K | 1220 | 915 | 600 | 917 | 1019 | 16.5 | 2.9 | 79 | F | Inventive |
| 60 | 2K | 1220 | 915 | 630 | 925 | 966 | 18.5 | 3.2 | 69 | F | Inventive |
| 61 | 2K | 1220 | 890 | 630 | 936 | 967 | 18.5 | 3.2 | 61 | F | Inventive |

[1]-[4]see remarks below Table 2.

TABLE 6

| | | Hot-rolling conditions | | | Tensile properties[1] | | | | Bendability[5,6] | | | | | |
| | | | | | | | | | Parallel to Rolling Direction | | Perpendicular to Rolling Direction | | | |
| Sheet | Steel | RHT (° C.) | FRT (° C.) | CT (° C.) | YS (MPa) | UTS (MPa) | El (%) | Gauge[2] (mm) | strain | angle | Strain | angle | Structure[4] | Example |
|---|---|---|---|---|---|---|---|---|---|---|---|---|---|---|
| 62 | 2G | 1220 | 920 | 600 | 771 | 826 | 16.7 | 2.9 | 0.78 | 175 | 0.86 | 170 | F | Inventive |
| 63 | 2H | 1220 | 915 | 600 | 742 | 801 | 18.6 | 3.0 | 0.75 | 180 | 0.65 | 179 | F | Inventive |
| 64 | 2I | 1220 | 890 | 600 | 729 | 819 | 18.8 | 2.9 | 0.83 | 180 | 0.75 | 172 | F | Inventive |
| 65 | 2J | 1220 | 905 | 600 | 979 | 1044 | 13.7 | 3.0 | 0.77 | 153 | 0.56 | 169 | F | Inventive |
| 66 | 2K | 1220 | 895 | 600 | 906 | 1001 | 16.7 | 3.0 | — | — | 0.65 | 156 | F | Inventive |

[1],[2] and [4] see remarks below Table 2.
[5]Bendability was determined according to VDA standards on machined plates (surface roughness from hot-rolling removed). The VDA angle was corrected to 1 mm thickness.
[6]In case of parallel bending ("Quer" in VDA terms), the deformation axis is parallel to the rolling direction and the bending axis is perpendicular to the rolling direction. In case of perpendicular bending ("Langs" in VDA terms), the deformation axis is perpendicular to the rolling direction and the bending axis is perpendicular to the rolling direction.

TABLE 7

| | | | Hot-rolling conditions | | | Tensile properties[1] | | | | | |
| Sheet | Steel | Sample | RHT (° C.) | FRT (° C.) | CT (° C.) | YS (MPa) | UTS (MPa) | El (%) | Gauge[2] (mm) | Structure[4] | Example |
|---|---|---|---|---|---|---|---|---|---|---|---|
| 1 | G | G-630 | 1220 | 890 | 630 | 782 | 824 | 19.4 | 3.0 | F | Inventive |
| 2 | I | I-600 | 1220 | 905 | 600 | 742 | 825 | 18.2 | 2.9 | F | Inventive |
| 3 | I | I-630 | 1220 | 900 | 630 | 774 | 837 | 18.8 | 3.0 | F | Inventive |

[1],[2] and [4] see remarks below Table 2.

TABLE 9

| | | Hot-rolling conditions | | | | Tensile properties[1] | | | | | | |
| Sheet | Steel | RHT (° C.) | FRT (° C.) | CR (° C./s) | CT (° C.) | YS (MPa) | UTS (MPa) | El (%) | Gauge[2] (mm) | λ[3] (%) | Structure[4] | Example |
|---|---|---|---|---|---|---|---|---|---|---|---|---|
| 1 | 3A | 1240 | 915 | 50 | 630 | 781 | 845 | 20.1 | 3.5 | 83 | F | Inventive |
| 2 | 3A | 1240 | 930 | 50 | 630 | 787 | 847 | 17.4 | 2.9 | 113 | F | Inventive |
| 3 | 3A | 1240 | 890 | 100 | 630 | 775 | 834 | 17.4 | 3.5 | 59 | F | Inventive |
| 4 | 3A | 1240 | 910 | 100 | 630 | 800 | 851 | 14.5 | 3.1 | 65 | F | Inventive |
| 5 | 3B | 1240 | 910 | 50 | 630 | 787 | 834 | 18.6 | 3.6 | 78 | F | Inventive |
| 6 | 3B | 1240 | 920 | 50 | 630 | 798 | 853 | 18.4 | 3.2 | 63 | F | Inventive |
| 7 | 3B | 1240 | 900 | 100 | 630 | 781 | 830 | 20.1 | 3.5 | 70 | F | Inventive |
| 8 | 3B | 1240 | 920 | 100 | 630 | 797 | 852 | 18.5 | 3.0 | 94 | F | Inventive |

[1]-[4]see remarks below Table 2.

The invention claimed is:

1. A high strength hot rolled steel sheet which was finish-hot rolled at a temperature of the $Ar_3$ transformation point or higher, and coiled in the temperature range of between at least 600° C. to less than 700° C., having an excellent combination of tensile strength of at least 550 MPa and formability, comprising in weight percent
 at most 0.15% of C
 at most 0.5% of Si
 between 0.5 and 2.0% of Mn
 at most 0.06% of P
 at most 0.008% of S
 at most 0.1% of Al_sol
 at most 0.02% of N
 between 0.02 and 0.45% of V
 between 0.05 and 0.7% of Mo
 optionally between 0.01 and 0.1% of Nb
 balance of Fe and inevitable impurities,
 wherein Ti is not deliberately added and at most an inevitable impurity such that there is less than 0.010% Ti and the microstructure is free from titanium-based precipitates or titanium-based inclusions, wherein the steel sheet has a precipitation strengthened microstructure of ferritic phase free from carbon-rich microstructural components selected from at least one member of the group consisting of pearlite and cementite, wherein the volume fraction of the ferrite phase in said microstructure is not lower than 97%, and wherein the precipitates in said microstructure comprise fine precipitates of composite carbides containing Mo and V and optionally Nb;
 wherein the contents of C, Nb, V and Mo represented by weight percentage satisfy equation I:

$$0.8 \leq \frac{(Nb/93) + (V/51) + (Mo/96)}{(C/12)} \leq 2.2; \quad \text{I}$$

wherein the contents of Nb, V and Mo represented by weight percentage satisfy equation II:

$$0.5 \le \frac{(Mo/96)}{(Nb/93)+(V/51)} \le 2.0. \quad \text{II}$$

wherein the contents of Al and N repreesnted by weight percentage satisfy the equation of $$\frac{(Al/27)}{(N/14)} < 1.$$

2. The steel sheet according to claim 1, wherein the precipitates in said ferritic microstructure comprise fine precipitates of composite carbides containing Mo and V and Nb.

3. The steel sheet according to claim 1, wherein the precipitates in said ferritic microstructure comprise fine precipitates of composite carbides containing Mo and V and wherein the fine precipitates of composite carbides do not contain Nb.

4. The steel sheet according to claim 1, wherein the steel comprises:
   at least 1.2% Mn and/or
   at least 0.02% Al_sol and/or
   at least 0.04% V and/or
   at least 0.1% Mo, and/or
   at least 0.02% C and/or
   at least 0.002% N.

5. The steel sheet according to claim 1, $$\frac{(Al/27)}{(N/14)} < 1$$

wherein the microstructure comprises in addition to the composite carbide precipitates also nitride and/or carbonitride precipitates containing V and optionally Nb.

6. The steel sheet according to claim 1, wherein the sheet was coiled in the temperature range of at least 630° C. to less than 700 ° C.

7. The steel sheet according to claim 1, wherein the alloy is Ti free.

8. The steel sheet according to claim 1, wherein the contents of C, N, Nb, V, Mo and Al represented by weight percentage satisfy the equation of $$0.8 \le \frac{(Nb/93)+(V/51)+(Mo/96)+(Al/27)}{(C/12)+(N/14)} \le 2.2.$$

9. The steel sheet according to claim 1,
   with a tensile strength of at least 580 MPa and a hole-expansion ratio of 90% or higher, or
   with a tensile strength of at least 750MPa and a hole-expansion ratio of 60% or higher, or
   with a tensile strength of at least 980 MPa and a hole-expansion ratio of 30% or higher.

10. The steel sheet according to claim 1, wherein the steel sheet has a zinc-based plated coating on the surface.

11. A method of manufacturing a high strength steel sheet having a precipitation strengthened microstructure of ferritic phase free from carbon-rich microstructural components selected from at least one member of the group consisting of pearlite and cementite, wherein the volume fraction of the ferrite phase in said microstructure is not lower than 97%, and wherein the precipitates in said microstructure comprise fine precipitates of composite carbides containing Mo and V and optionally Nb, with an excellent combination of tensile strength of at least 550 MPa and formability, or with a tensile strength of at least 750 MPa and a hole-expansion ratio of at least 60%, or with a tensile strength of at least 980 MPa and a hole-expansion ratio of at least 30%, comprising
   hot rolling a steel slab comprising at most 0.15% of C, at most 0.5% of Si, between 0.5 and 2.0% of Mn, at most 0.06% of P, at most 0.008% of S, at most 0.1% of Sol. Al, at most 0.02% of N, between 0.02 and 0.45% of V, between 0.05 and 0.7% of Mo, optionally between 0.01 and 0.1% of Nb, and the balance of Fe and inevitable impurities wherein Ti is not deliberately added and at most an inevitable impurity such that there is less than 0.010% Ti and the microstructure is free from titanium-based precipitates or titanium-based inclusions and
   finishing said hot rolling at a finish hot rolling temperature of Ar3 transformation point or higher, and
   coiling the hot rolled steel sheet in a temperature range of at least 600° C. to less than 700° C.;
   wherein the contents of C, Nb, V and Mo represented by weight percentage satisfy equation I:

$$0.8 \le \frac{(Nb/93)+(V/51)+(Mo/96)}{(C/12)} \le 2.2; \quad \text{I}$$

wherein the contents of Nb, V and Mo represented by weight percentage satisfy equation II:

$$0.5 \le \frac{(Mo/96)}{(Nb/93)+(V/51)} \le 2.0. \quad \text{II}$$

wherein the contents of Al and N represented by weight percentage satisfy the equation of $$\frac{(Al/27)}{(N/14)} < 1.$$

12. A method according to claim 11, wherein the hot rolled steel sheet is cooled to the coiling temperature at an average cooling rate of about 10° C./s to about 150° C./s.

13. The method of manufacturing a high strength steel sheet according to claim 11, further comprising applying a zinc-based plating to the surface of the steel sheet.

14. A high strength hot rolled steel sheet which was finish-hot rolled at a temperature of the $Ar_3$ transformation point or higher, and coiled in the temperature range of between at least 600° C. to less than 700° C., having an excellent combination of tensile strength of at least 550 MPa and formability, comprising in weight percent
   at most 0.15% of C
   at most 0.5% of Si
   between 0.5 and 2.0% of Mn
   at most 0.06% of P
   at most 0.008% of S
   at most 0.1% of Al sol
   at most 0.02% of N
   between 0.02 and 0.45% of V
   between 0.05 and 0.7% of Mo
   balance of Fe and inevitable impurities, wherein Ti is not deliberately added and at most an inevitable impurity such that there is less than 0.010% Ti and the microstructure is free from titanium-based precipitates or titanium-based inclusions, wherein the steel sheet has a precipitation strengthened microstructure of ferritic phase free from carbon-rich microstructural components selected from at least one member of the group consisting of pearlite and cementite, wherein the volume fraction of the ferrite phase in said microstructure is not lower than 97%, and wherein the precipitates in said microstructure comprise fine precipitates of composite carbides containing Mo and V and optionally Nb;
wherein the contents of C, Nb, V and Mo represented by weight percentage satisfy equation I:

$$0.8 \leq \frac{(Nb/93) + (V/51) + (Mo/96)}{(C/12)} \leq 2.2; \quad \text{I}$$

wherein the contents of Nb, V and Mo represented by weight percentage satisfy equation II:

$$0.5 \leq \frac{(Mo/96)}{(Nb/93) + (V/51)} \leq 2.0. \quad \text{II}$$

wherein the steel sheet
has a tensile strength of at least 750 MPa and a hole-expansion ratio of at least 60%, and in which tensile strength (TS), total elongation (El), and sheet thickness t (mm) satisfy the equation of $(TS \times El)/t^{0.2} > 12000$ or
has a tensile strength of at least 980 MPa and a hole-expansion ratio of at least 30%, and in which tensile strength (TS), total elongation (El), and sheet thickness t (mm) satisfy the equation of $(TS \times El)/t^{0.2} > 13000$ or
has a yield strength of at least 760 MPa, a minimum yield ratio of 0.9, and a hole-expansion ratio of at least 60%, and a minimum fatigue strength ($\Delta \sigma$) for 100000 cycles to failure of 1000 MPa, and in which tensile strength (TS), total elongation (El), and sheet thickness t (mm) satisfy the equation of $(TS \times El)/t^{0.2} > 12000$.

15. The steel sheet according to claim 14, wherein the contents of Al and N represented by weight percentage satisfy the equation of $$\frac{(Al/27)}{(N/14)} < 1$$

and wherein the microstructure comprises in addition to the composite carbide precipitates also nitride and/or carbonitride precipitates containing V and optionally Nb.

16. The method according to claim 11, wherein the sheet was coiled in the temperature range of at least 630° C. to less than 700° C.

17. The steel sheet according to claim 1, wherein the contents of Nb, V and Mo represented by weight percentage satisfy the equation of $$1.0 \leq \frac{(Mo/96)}{(Nb/93) + (V/51)} \leq 2.0.$$

18. The steel sheet according to claim 1, wherein the contents of C, N, Nb, V, Mo and Al represented by weight percentage satisfy the equation of $$1.2 \leq \frac{(Nb/93) + (V/51) + (Mo/96) + (Al/27)}{(C/12) + (N/14)} \leq 2.2.$$

19. An automotive chassis or suspension part using the high strength hot rolled steel sheet according to claim 1.

20. An automotive chassis or suspension part using the high strength hot rolled steel sheet produced according to the method of claim 11.

21. An automotive chassis or suspension part using the high strength hot rolled steel sheet according to claim 14.

22. A method of manufacturing a high strength steel sheet having a precipitation strengthened microstructure of ferritic phase free from carbon-rich microstructural components selected from at least one member of the group consisting of pearlite and cementite, wherein the volume fraction of the ferrite phase in said microstructure is not lower than 97%, and wherein the precipitates in said microstructure comprise fine precipitates of composite carbides containing Mo and V and optionally Nb, with an excellent combination of tensile strength of at least 550 MPa and formability, or with a tensile strength of at least 750 MPa and a hole-expansion ratio of at least 60%, or with a tensile strength of at least 980 MPa and a hole-expansion ratio of at least 30%, comprising:
hot rolling a steel slab comprising in weight percent
at most 0.15% of C,
at most 0.5% of Si,
between 0.5 and 2.0% of Mn,
at most 0.06% of P,
at most 0.008% of S,
at most 0.1% of Sol. Al,
at most 0.02% of N,
between 0.02 and 0.45% of V,
between 0.05 and 0.7% of Mo,
optionally between 0.01 and 0.1% of Nb, and
the balance of Fe and inevitable impurities and
finishing said hot rolling at a finish hot rolling temperature of Ar3 transformation point or higher, and
coiling the hot rolled steel sheet in a temperature range of at least 600° C. to less than 700° C.;
wherein the contents of C, Nb, V and Mo represented by weight percentage satisfy equation I:

$$0.8 \leq \frac{(Nb/93) + (V/51) + (Mo/96)}{(C/12)} \leq 2.2; \quad \text{I}$$

wherein the contents of Nb, V and Mo represented by weight percentage satisfy equation II $$0.5 \leq \frac{(Mo/96)}{(Nb/93) + (V/51)} \leq 2.0. \quad \text{II}$$

wherein the steel sheet
has a tensile strength of at least 750 MPa and a hole-expansion ratio of at least 60%, and in which tensile strength (TS), total elongation (El), and sheet thickness t (mm) satisfy the equation of $(TS \times El)/t^{0.2} > 12000$ or has a tensile strength of at least 980 MPa and a hole-expansion ratio of at least 30%, and in which tensile strength (TS), total elongation (El), and sheet thickness t (mm) satisfy the equation of $(TS \times El)/t^{0.2} > 13000$ or has a yield strength of at least 760 MPa, a minimum yield ratio of 0.9, and a hole-expansion ratio of at least 60%, and a minimum fatigue strength ($\Delta\sigma$) for 100000 cycles to failure of 1000 MPa, and in which tensile strength (TS), total elongation (El), and sheet thickness t (mm) satisfy the equation of $(TS \times El)/t^{0.2} > 12000$.

23. An automotive chassis or suspension part using the high strength hot rolled steel sheet produced according to the method of claim 22.

* * * * *

UNITED STATES PATENT AND TRADEMARK OFFICE
CERTIFICATE OF CORRECTION

| | | |
|---|---|---|
| PATENT NO. | : 9,908,566 B2 | Page 1 of 1 |
| APPLICATION NO. | : 14/399448 | |
| DATED | : March 6, 2018 | |
| INVENTOR(S) | : Rolf Arjan Rijkenberg and David Neal Hanlon | |

It is certified that error appears in the above-identified patent and that said Letters Patent is hereby corrected as shown below:

In the Claims

In Column 23, Claim 5, Lines 30-35 delete:

$$\frac{(Al/27)}{(N/14)} \leq 4$$

In Column 24, Claim 11, Lines 15-18 should read:
impurities and

In Column 24, Claim 14, Line 67 should read:
optionally between 0.01 and 0.1% of Nb Signed and Sealed this
Third Day of July, 2018

Andrei Iancu
*Director of the United States Patent and Trademark Office*